US012613566B2

(12) United States Patent
Krishnaswamy et al.

(10) Patent No.: US 12,613,566 B2
(45) Date of Patent: Apr. 28, 2026

(54) SYSTEM AND METHOD FOR FACILITATING SMART ENERGY MANAGEMENT IN A NETWORK

(71) Applicant: JIO PLATFORMS LIMITED, Ahmedabad (IN)

(72) Inventors: Dilip Krishnaswamy, Bangalore (IN); Dipender Bhamrah, Noida (IN); Rajeev Gupta, Mumbai (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 438 days.

(21) Appl. No.: 18/247,451

(22) PCT Filed: Mar. 2, 2023

(86) PCT No.: PCT/IB2023/051945
§ 371 (c)(1),
(2) Date: Mar. 31, 2023

(87) PCT Pub. No.: WO2023/166457
PCT Pub. Date: Sep. 7, 2023

(65) Prior Publication Data
US 2024/0411353 A1      Dec. 12, 2024

(30) Foreign Application Priority Data
Mar. 3, 2022      (IN) .............................. 202221011559

(51) Int. Cl.
*G06F 1/3209*      (2019.01)
(52) U.S. Cl.
CPC .................................. *G06F 1/3209* (2013.01)

(58) Field of Classification Search
CPC .... G06F 1/3209; G06F 11/3062; H04W 4/38; H04W 4/70; H04L 43/08; H04L 9/50;
(Continued)

(56) References Cited

U.S. PATENT DOCUMENTS

| 10,861,112 B2 | 12/2020 | Forbes et al. | |
| 2007/0203860 A1* | 8/2007 | Golden .................. | G06Q 50/06 |
| | | | 705/412 |

(Continued)

FOREIGN PATENT DOCUMENTS

WO      2013168419 A1      11/2013

OTHER PUBLICATIONS

International Search Report, PCT/IB2023/051945, mailed Jun. 28, 2023, Total pp. 03.

*Primary Examiner* — Chun Cao
(74) *Attorney, Agent, or Firm* — FINNEGAN, HENDERSON, FARABOW, GARRETT & DUNNER, LLP

(57)      ABSTRACT

The present disclosure provides a system and a method for facilitating smart energy management services in a network. In particular, the system provides the smart energy management services to users, enterprises, and the like. The system may collect information related to operation of one or more computing devices in a network, extract one or more parameters related to one or more sources of energy based on the collected information, and provide personalized energy management services to each of the one or more computing devices in the network via network slicing. The energy management services may include one or more recommendations to be executed at the one or more computing devices.

27 Claims, 4 Drawing Sheets

(58) Field of Classification Search
CPC ........ H04L 12/16; G06Q 10/04; G06Q 10/06;
G06Q 2220/00; G06Q 30/0201; G06Q
30/0283; G06Q 30/04; G06Q 50/06;
G06Q 50/10; G16Y 10/75; G16Y 40/10;
Y04S 40/12
USPC ........................................................ 713/310
See application file for complete search history.

(56) References Cited

U.S. PATENT DOCUMENTS

| | | | |
|---|---|---|---|
| 2011/0137763 A1* | 6/2011 | Aguilar .............. | G06Q 30/0282 |
| | | | 705/347 |
| 2012/0215725 A1* | 8/2012 | Imes ...................... | F24F 11/523 |
| | | | 705/412 |
| 2014/0371939 A1* | 12/2014 | Weaver ................. | H04W 74/00 |
| | | | 700/295 |
| 2015/0100466 A1 | 4/2015 | Deguchi | |
| 2016/0179159 A1* | 6/2016 | van Campen ....... | G06F 11/3476 |
| | | | 713/340 |
| 2017/0139457 A1* | 5/2017 | Grimes ................. | H02J 3/0012 |
| 2019/0372345 A1* | 12/2019 | Bain ...................... | H02J 3/008 |
| 2021/0090185 A1* | 3/2021 | Forbes, Jr. ........ | H02J 13/00034 |
| 2021/0123771 A1* | 4/2021 | Vega ...................... | H04Q 9/00 |
| 2022/0021538 A1* | 1/2022 | Madisetti ............. | H04L 41/044 |
| 2023/0259895 A1* | 8/2023 | Zou ......................... | G08B 6/00 |
| | | | 702/188 |

* cited by examiner

100

200

FIRST COMPUTING DEVICE
202

SENSORS
204

SYSTEM
206

DATA
COLLECTION
208

DATA ANALYSING
210

DATA
PREDICATION
212

DATA STORAGE
214

DATABASE
216

SYSTEM AND METHOD FOR FACILITATING SMART ENERGY MANAGEMENT IN A NETWORK

RESERVATION OF RIGHTS

FIELD OF DISCLOSURE

The embodiments of the present disclosure generally relate to energy management services in a network. In particular, the present disclosure relates to management and prediction of energy consumption in the network.

BACKGROUND OF DISCLOSURE

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

With an increase in economic growth and consumption patterns, there is a growing demand for energy. There is an increasing concern about the costs and/or environmental impact of energy generation and consumption.

At the same time, there is an increasing deployment around the world of more advanced metering systems, such as "interval" or "time-of-use" meters, and more sophisticated "smart meters." Whereas conventional meters simply record total consumption, without maintaining any records of time of use, these more advanced meters are able to identify and record energy consumption in greater detail, for example on an hourly, or even more frequent, basis.

However, the full benefit of such technologies can only be achieved if users are equipped with the necessary information regarding their energy usage, and empowered to act effectively on the basis of that information.

Accordingly, while the technological infrastructure enabling users to improve their behaviour is becoming available, there remains a need to provide users with effective tools and facilities for reviewing and acting upon the available information in an effective manner.

There is, therefore, a need in the art to provide a system and a method that facilitates smart monitoring of energy consumption in a network and providing smart energy management services to overcome the shortcomings of the existing systems and methods.

SUMMARY

This section is provided to introduce certain objects and aspects of the present disclosure in a simplified form that are further described below in the detailed description. This summary is not intended to identify the key features or the scope of the claimed subject matter.

In an aspect, the present disclosure relates to a system for facilitating energy management services. The system includes one or more processors, and a memory operatively coupled to the one or more processors, where the memory includes processor-executable instructions, which on execution, cause the one or more processors to record information corresponding to operation of one or more computing devices in a network, extract one or more parameters corresponding to one or more sources of energy in the network based on the recorded information; and based on the extracted one or more parameters and the recorded information of the one or more computing devices, provide personalized energy management services to each of the one or more computing devices via at least one slice of the network. In an embodiment, the personalized energy management services include one or more recommendations to be executed at the one or more computing devices.

In an embodiment, the information corresponding to the operation of the one or more computing devices includes at least one of an amount of energy usage by the one or more computing devices over a predetermined time period, and connectivity of the one or more computing devices to said one or more sources of energy.

In an embodiment, the information corresponding to the operation of the one or more computing devices is collected by one or more sensors associated with the one or more computing devices in the network.

In an embodiment, the one or more parameters corresponding to said one or more sources of energy include at least one of an amount of renewable energy produced at said one or more sources of energy, battery (charge) storage capacity, and dynamic energy pricing.

In an embodiment, the one or more recommendations correspond to least one of consumption of the amount of renewable energy produced at said one or more sources of energy, and feeding of excess energy back to said one or more sources of energy based on the dynamic energy pricing.

In an embodiment, the one or more processors provide the one or more recommendations by being configured to predict an expected energy consumption by the one or more computing devices at a predetermined time period based on the recorded information and the extracted one or more parameters.

In an embodiment, the network includes said at least one slice for facilitating communication between the one or more computing devices and the system.

In an embodiment, the information corresponding to the operation of the one or more computing devices is collected from one or more sensors over a massive machine-type communications (mMTC) network slice.

In an embodiment, the system may execute a smart contract for providing the personalized energy management services to each of the one or more computing devices via said at least one slice of the network.

In an embodiment, the system may be implemented as a blockchain-based platform to execute the smart contract.

In an embodiment, the system may be implemented in a hierarchical network. In an embodiment, the hierarchical network may include a layer 2 network with the smart contract layered on top of layer 1 network of blockchain nodes, and where aggregated data is submitted at the hierarchical network from the layer 2 network to the layer 1 network.

In another aspect, the present disclosure relates to a method for providing energy management services. The method includes recording, by one or more processors, information corresponding to operation of one or more computing devices in a network, extracting, by the one or more processors, one or more parameters corresponding to one or more sources of energy in the network based on the recorded information, and based on the extracted one or more parameters and the recorded information of the one or more computing devices, providing, by the one or more processors, personalized energy management services to each of the one or more computing devices via at least one slice of the network. The personalized energy management services include one or more recommendations to be executed at the one or more computing devices.

In an embodiment, the information corresponding to the operation of the one or more computing devices includes at least one of an amount of energy usage by the one or more computing devices over a predetermined time period, and connectivity of the one or more computing devices to said one or more sources of energy.

In an embodiment, the information corresponding to the operation of the one or more computing devices is recorded by one or more sensors associated with the one or more computing devices in the network.

In an embodiment, the one or more parameters corresponding to said one or more sources of energy include at least one of an amount of renewable energy produced at said one or more sources of energy, battery (charge) storage capacity, and dynamic energy pricing.

In an embodiment, the one or more recommendations correspond to at least one of consumption of the amount of renewable energy produced at said one or more sources of energy, and feeding of excess energy back to said one or more sources of energy based on the dynamic energy pricing.

In an embodiment, the method includes predicting, by the one or more processors, an expected energy consumption by the one or more computing devices at a predetermined time period based on the recorded information and the extracted one or more parameters.

In an embodiment, the information corresponding to the operation of the one or more computing devices is collected from one or more sensors over anmMTC network slice.

In an embodiment, the method may include executing, by the one or more processors, a smart contract for providing the personalized energy management services to each of the one or more computing devices via said at least one slice of the network.

In an embodiment, the method may include implementing, by the one or more processors, a blockchain-based platform to execute the smart contract.

In another aspect, the present disclosure relates to a user equipment. The user equipment includes one or more processors, and a memory operatively coupled to the one or more processors, where the memory includes processor-executable instructions, which on execution, cause the one or more processors to send information corresponding to operation of the user equipment to a system in a network, receive one or more recommendations from the system via at least one slice of the network, and execute the one or more recommendations at a predetermined time period. The one or more recommendations are based at least on the information corresponding to the operation of the user equipment and one or more parameters corresponding to one or more energy sources in the network.

In an embodiment, the information corresponding to the operation of the user equipment may be recorded by one or more sensors associated with the user equipment in the network.

In an embodiment, the one or more parameters corresponding to said one or more energy sources may include at least one an amount of renewable energy produced at said one or more energy sources, battery (charge) storage capacity, and dynamic energy pricing.

In an embodiment, the one or more recommendations may correspond to at least one of consumption of the amount of renewable energy produced at said one or more energy sources, and feeding of excess energy back to said one or more energy sources based on the dynamic energy pricing.

In an embodiment, the memory comprises processor-executable instructions, which on execution, cause the one or more processors to receive the one or more recommendations from the system based on a smart contract being executed at the system.

In an embodiment, the memory comprises processor-executable instructions, which on execution, cause the one or more processors to receive the one or more recommendations from the system being implemented as a blockchain-based platform.

In an aspect, the present disclosure relates to a non-transitory computer-readable medium including processor-executable instructions that cause a processor to record information corresponding to operation of one or more computing devices in a network, extract one or more parameters corresponding to one or more sources of energy in the network based on the recorded information, and based on the extracted one or more parameters and the recorded information of the one or more computing devices, provide personalized energy management services to each of the one or more computing devices via at least one slice of the network, wherein the personalized energy management services include one or more recommendations to be executed at the one or more computing devices.

OBJECTS OF THE PRESENT DISCLOSURE

Some of the objects of the present disclosure, which at least one embodiment herein satisfies are as listed herein below.

It is an object of the present disclosure to provide a system and a method for facilitating smart energy management in a network.

It is an object of the present disclosure to predict and provide personalized smart energy management services to users or enterprises.

It is an object of the present disclosure to facilitate network slicing based on time criticality of services or network performance requirements, knowledge of renewable energy availability, stored energy availability, and dynamic grid pricing.

It is an object of the present disclosure to provide blockchain-based platforms to execute smart contracts to render smart energy management services.

BRIEF DESCRIPTION OF DRAWINGS

The accompanying drawings, which are incorporated herein, and constitute a part of this invention, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Some drawings may indicate the components using block diagrams and may not represent the internal circuitry of each component. It will be appreciated by those skilled in the art that invention of such drawings includes the invention of electrical components, electronic components or circuitry commonly used to implement such components.

Figure 1:
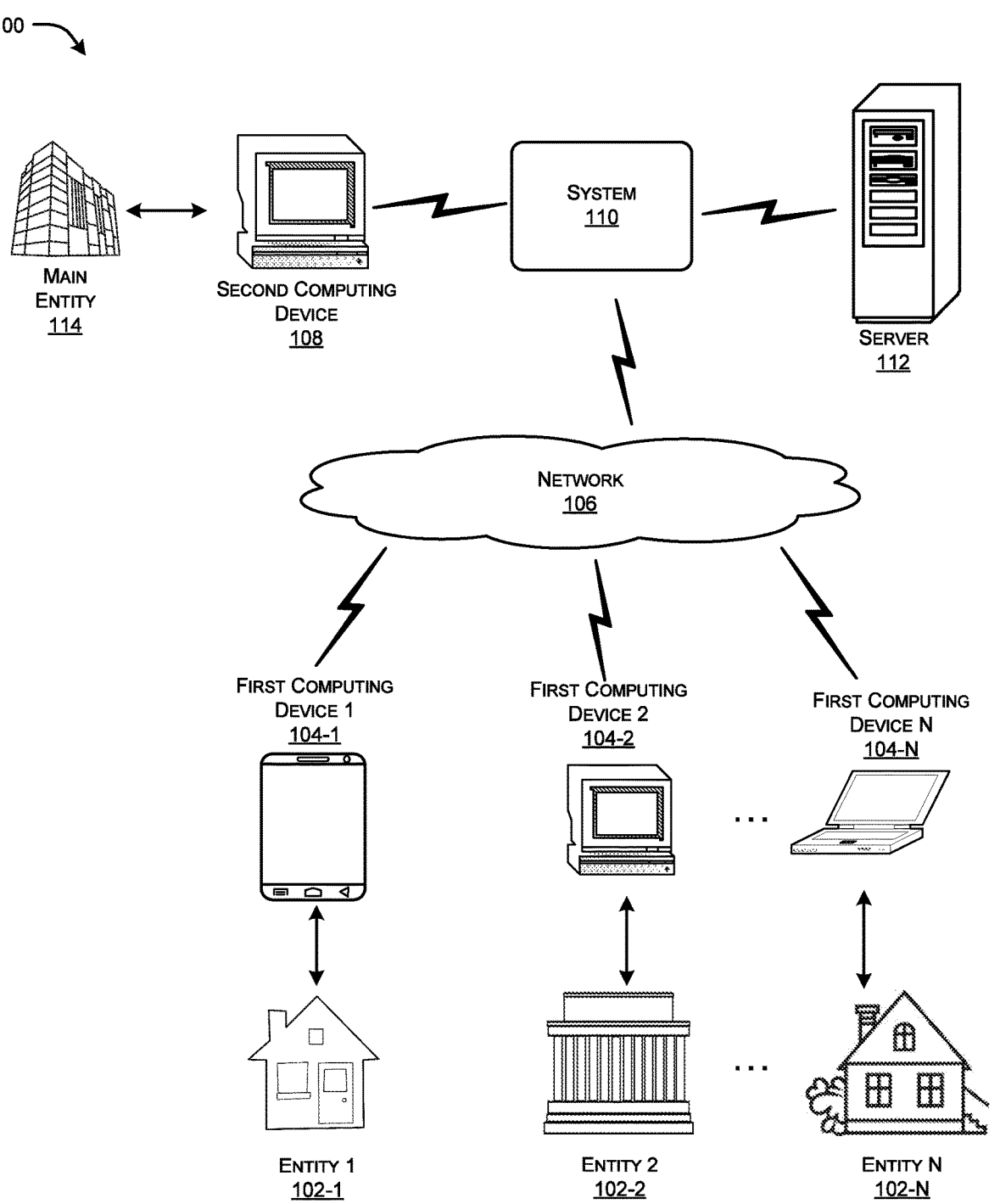

FIG. 1 illustrates an exemplary network architecture in which or with which embodiments of the present disclosure may be implemented.

Figure 2:
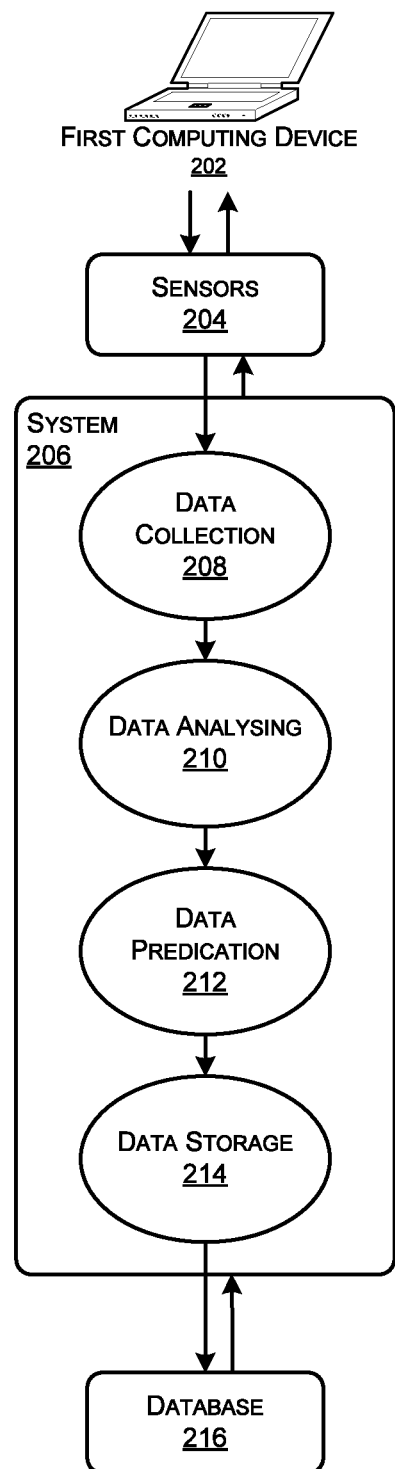

FIG. 2 illustrates an example network architecture for managing energy consumption associated with one or more computing device(s), in accordance with an embodiment of the present disclosure.

Figure 3:
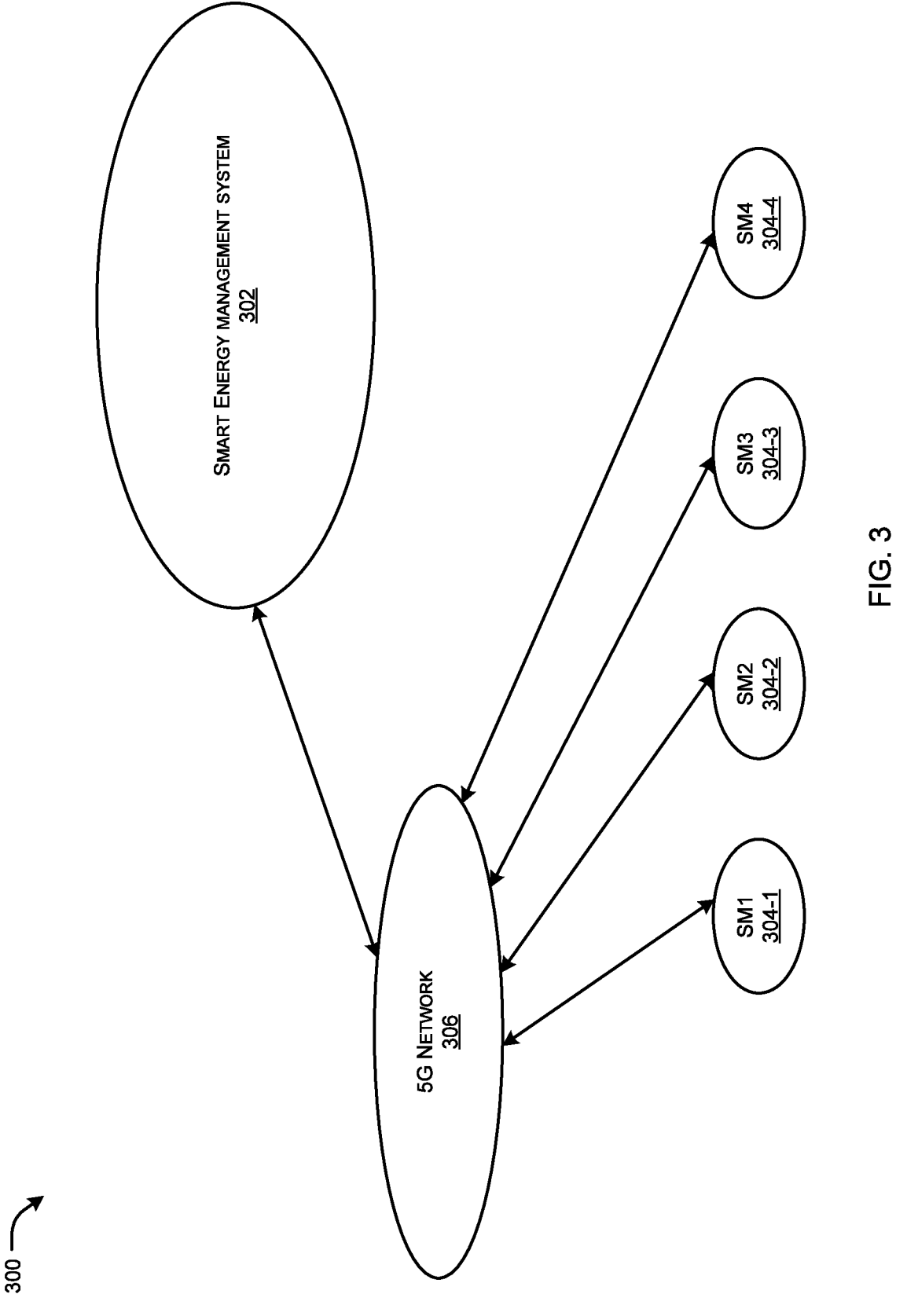

FIG. 3 illustrates an exemplary network architecture in which or with which embodiments of the present disclosure may be implemented.

Figure 4:
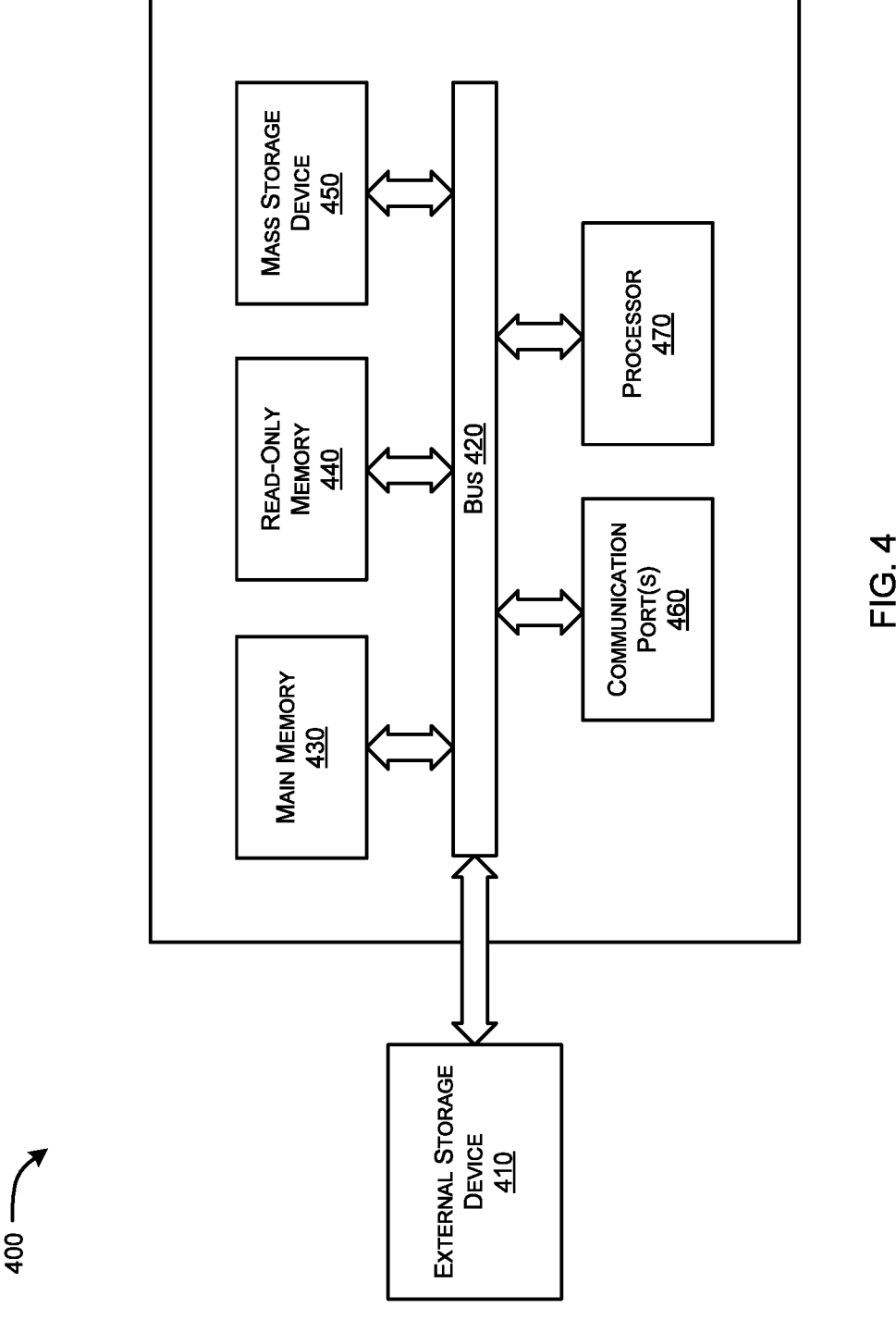

FIG. 4 illustrates an exemplary computer system in which or with which embodiments of the present invention can be utilized in accordance with embodiments of the present disclosure.

The foregoing shall be more apparent from the following more detailed description of the disclosure.

BRIEF DESCRIPTION OF DISCLOSURE

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the disclosure as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Reference throughout this specification to "one embodiment" or "an embodiment" or "an instance" or "one instance" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

The present disclosure provides a robust and effective solution for facilitating smart energy management services in a network. In particular, the disclosed solution provides forecasting energy requirements of one or more individual devices in a network and recommending smart energy management services (or, actions). For example, smart recommendations may be provided at non-peak hours based on energy consumption and differential pricing to the one or more individual devices. Further, the present disclosure utilizes one or more machine learning models for monitoring and learning energy usage behaviour of the one or more individual devices, such that the machine learning models assist in predicting future energy consumptions and/or optimal energy consumptions by the one or more individual devices in the network. Furthermore, demands for energy management services may vary across the one or more individual devices based on latency, criticality, and/or bandwidth requirements. The smart energy management services may be rendered to meet such requirements.

Therefore, embodiments of the present disclosure relate to facilitating smart energy management services in a network. In particular, a system may be provided for dynamically providing personalized energy management services to one or more devices in the network by way of, but not limited to, providing one or more recommendations corresponding to optimal energy consumption by the one or more devices. In an embodiment, the present disclosure relates to smart device environments. In an embodiment, the present disclosure relates to the Internet of Things (IoT), and more particularly, to communication among devices via the IoT.

In accordance with the embodiments described herein, information corresponding to the one or more devices in the network may be collected. In some embodiments, one or more sensors such as, but not limited to, smart meters, may be deployed for recording the information of the one or more devices. Further, using the collected information, an artificial intelligence (AI)-triggered system may predict future energy consumption of the one or more devices in the network. In an embodiment, one or more parameters corresponding to one or more energy sources may be extracted based on which the AI-triggered system may perform predictions. In an embodiment, the one or more parameters include, but are not limited to, renewable energy produced by the one or more energy sources, battery (charge) storage capacity, and the like. The AI-triggered system may make use of suitable machine learning models for making such predictions.

Accordingly, the present disclosure offers new insights across the one or more devices in the network. In particular, information of the one or more devices that is collected and recorded across the network (e.g., network ecosystem) provides insights on energy consumption. Other like benefits and advantages are provided by the present disclosure, which will be discussed in detail throughout the disclosure.

Certain terms and phrases have been used throughout the disclosure and will have the following meanings in the context of the ongoing disclosure.

The term "Internet of Things" may refer to a computing environment in which physical objects are embedded with devices which enable the physical objects to achieve greater value and service by exchanging data with other systems and/or other connected devices. Each physical object is uniquely identifiable through its embedded device(s) and is able to interoperate within an Internet infrastructure. The acronym "IoT," as used herein, means "Internet of Things."

The term "blockchain" may refer to any one of various blockchain technology types and or blockchain fabrics that utilize smart contracts. Smart contracts for blockchain can reside in Etherium, Hyperledger, or Quorum as some of the possible blockchain technology or technology fabrics with variants of these and other blockchain ecosystems continue to be created. This may include hierarchical fabrics such as layer 2 Lightning Networks with smart contracts layered on top of layer 1 Bitcoin network of blockchain nodes, or alternate Blockchain realizations (such as a virtual distributed ledger technology (DLT) network layered on top of an Etherium network). Aggregate transactions may be submitted in such hierarchical networks from a layer 2 network to a layer 1 network. However, the use of blockchain and smart contacts is meant for illustrative purposes only and is not intended to limit the scope to a particular blockchain technology.

The term "network slicing" may refer to a network architecture that enables the multiplexing of virtualized and independent logical networks on the same physical network infrastructure. Each slice of network may be an isolated end-to-end network tailored to fulfil diverse requirements requested by a particular application.

The term "smart meter" may refer to one or more sensor (s) that provide detailed information on consumption (for example, energy in the form of electricity) in order to increase knowledge about the status of an electricity grid, which improves the performance and the quality of service for end users.

The term "microgrid" may refer to a small network of energy/electricity users with a local source of energy supply that is usually attached to a centralized national grid but is able to function independently.

The various embodiments throughout the disclosure will be explained in more detail with reference to FIGS. 1-4.

FIG. 1 illustrates an exemplary network architecture (100) in which or with which embodiments of the present disclosure may be implemented.

Referring to FIG. 1, the network architecture (100) may include one or more first computing devices (104-1, 104-2 . . . 104-N) associated with one or more entities (102-1. 102-2 . . . 102-N) deployed in an environment. A person of ordinary skill in the art will understand that one or more entities may be individually referred to as the entity (102) and collectively referred to as the entities (102). In an embodiment, the entity (102) may include a user, an enterprise, an organisation, an industry, smart home environments, utilities, or the like. In an embodiment, the entity (102) may be referred to as a community including a number of the one or more first computing devices (104-1, 104-2 . . . 104-N). A person of ordinary skill in the art will understand that each of the entities (102) may be at different geographical locations, which may either be in proximity to each other or remotely located with respect to each other. Although three entities (102) are depicted in FIG. 1, however any number of entities (102) may be included without departing from the scope of the ongoing description.

Further, a person of ordinary skill in the art will understand that one or more first computing devices may be individually referred to as the first computing device (104) and collectively referred to as the first computing devices (104). In an embodiment, the first computing device (104) may be referred to as a user equipment (UE). A person of ordinary skill in the art will appreciate that the terms "first computing device(s)" and "UE" may be used interchangeably throughout the disclosure. Although three computing devices (104) are depicted in FIG. 1, however any number of computing devices (104) may be included without departing from the scope of the ongoing description.

In an embodiment, the first computing device (104) may include smart devices operating in a smart environment, for example, the IoT system. In such an embodiment, the first computing device (104) may include, but is not limited to, smart phones, smart watches, smart sensors (e.g., mechanical, thermal, electrical, magnetic, etc.), networked appliances, networked peripheral devices, networked lighting system, communication devices, networked vehicle accessories, networked vehicular devices, smart accessories, tablets, smart television (TV), computers, smart security system, smart home system, other devices for monitoring or interacting with or for users and/or entities (102), or any combination thereof. In an embodiment, the first computing device (104) may include one or more of the following components: sensor, radio frequency identification (RFID) technology, Global Positioning System (GPS) technology, mechanisms for real-time acquisition of data, passive or interactive interface, mechanisms of outputting and/or inputting sound, light, heat, electricity, mechanical force, chemical presence, biological presence, location, time, identity, other information, or any combination thereof.

A person of ordinary skill in the art will appreciate that the first computing device (104) may include, but is not limited to, intelligent, multi-sensing, network-connected devices, that can integrate seamlessly with each other and/or with a central server or a cloud-computing system or any other device that is network-connected.

In an embodiment, the first computing device (104) may include, but is not limited to, a handheld wireless communication device (e.g., a mobile phone, a smart phone, a phablet device, and so on), a wearable computer device (e.g., a head-mounted display computer device, a head-mounted camera device, a wrist watch computer device, and so on), a GPS device, a laptop computer, a tablet computer, or another type of portable computer, a media playing device, a portable gaming system, and/or any other type of computer device (104) with wireless communication capabilities, and the like. In an embodiment, the first computing device (104) may include, but is not limited to, any electrical, electronic, electro-mechanical, or an equipment, or a combination of one or more of the above devices such as virtual reality (VR) devices, augmented reality (AR) devices, laptop, a general-purpose computer, desktop, personal digital assistant, tablet computer, mainframe computer, or any other computing device, wherein the first computing device (104) may include one or more in-built or externally coupled accessories including, but not limited to, a visual aid device such as camera, audio aid, a microphone, a keyboard, and input devices for receiving input from a user or the entity (102) such as touch pad, touch enabled screen, electronic pen, and the like.

A person of ordinary skill in the art will appreciate that the first computing devices or UEs (104) may not be restricted to the mentioned devices and various other devices may be used.

Referring to FIG. 1, the first computing devices (104) may communicate with a system (110), for example, an energy management system, through a network (106). In an embodiment, the network (106) may include at least one of a Fifth Generation (5G) network, or the like. The network (106) may enable the first computing devices (104) to communicate with other devices in the network architecture (100) and/or with the system (110). The network (106) may include a wireless card or some other transceiver connection to facilitate this communication. In another embodiment, the network (106) may be implemented as, or include, any of a variety of different communication technologies such as a wide area network (WAN), a local area network (LAN), a wireless network, a mobile network, a Virtual Private Network (VPN), the Internet, the Public Switched Telephone Network (PSTN), or the like.

In accordance with embodiments of the present disclosure, the system (110) may be a smart energy management system. In particular, the system (110) may be designed and configured for the management of energy consumption of the first computing devices (104) associated with the one or more entities (102). As such, the system (110) has the capability of separately monitoring and managing energy usage across a number of individual entities (102), as well as within an entity (102) as a whole. Alternatively, or additionally, the system (110) may manage demand response for the first computing device(s) (104).

Referring to FIG. 1, the system (110) may be communicatively coupled to a second computing device (108). The second computing device (108) may be, for example, a conventional personal computer (PC) or terminal interface, or a flat panel touch screen display, or the like. In an embodiment, the second computing device (108) may be associated with a main entity (114) such as, but not limited to, an energy grid, microgrid, or the like. The system (110) may communicate with the main entity (114) via the second computing device (108). In an embodiment, a user at the main entity (114) may control and manage each of the entities (102) via the second computing device (108) without necessarily being on-site at any of the entities (102). Because the main entity (114) is in communication with the entities (102) through the system (110) and the network (106), the main entity (114) may be located at any geographic location while providing complete control and management of all of the first computing devices (104) at the entities (102).

In an embodiment, the main entity (114) may include, but not be limited to, a micro-grid of renewable energy producers that can collaborate and optimize energy consumption in the network architecture (100). In an embodiment, the main entity (114) may comprise one or more energy storage facilities to store dynamic excess energy produced. Alternatively, or additionally, surplus energy may be sold back to the main entity (114) based on optimization of supply and demand of energy consumption at the first computing devices (104). As explained in more detail herein, the main entity (114) may provide energy to various first computing devices (104) during particular times such as, but not limited to, peak hours, non-peak hours, or the like. One or more alternative energy sources may also be provided in order to provide energy to the first computing devices (104).

It is not necessary in all embodiments that the main entity (114) directly provides energy to the first computing devices (104). For example, the main entity (114) could be tied to an energy system in one or more entities (102) and energy would be supplied through that path to the first computing devices (104).

In another embodiment, the first computing device (104) may represent aggregate energy usage nodes in a micro-grid. A group of entities (102) may constitute various micro-grid nodes that consume energy. Alternatively, or additionally, the group of entities (102) may produce energy. In an example embodiment, each entity (102) may represent an individual home in a smart city with renewable energy generation. In another example embodiment, the first computing device (104) may represent electric vehicle charging facilities, drone charging stations, or the like. In an example embodiment, the first computing devices (104), the entities (104), and/or the main entity (114) may refer to distributed energy resources (DERs) that may produce and/or consume energy.

Referring to FIG. 1, the system (110) may be operatively coupled to a server (112). In an embodiment, the first computing devices (104) and/or the second computing device (108) may be capable of data communications and information sharing with the server (112) through the network (106). In an embodiment, the server (112) may be a centralised server or a cloud-computing system or any other device that is network-connected. In an embodiment, the server (112) may include AI-triggered engines that utilize one or more machine learning models and/or blockchain micro services. The AI-triggered engines may provide support for predictive models that may enable early detection of a trending digital asset. An increasing viral trend with respect to interactions observed in social media related to a digital asset, or increasing interest in acquiring the digital asset on the blockchain system may be used as a trigger. Different machine learning models may be used to enable prediction, such as classification-based or regression-based techniques related to previous trending digital assets. Classification techniques may include machine learning techniques such as K-means clustering, decision-tree-based classification, random-forest techniques, deep learning-based classification systems, or ensembled learning systems. Regression-based techniques may include linear regression, or non-linear regression-based techniques, time-series based analysis, deep learning systems for time series analysis such as Recurrent Neural Networks (RNNs), Long short-term memory (LSTM) systems, etc. The server (112) may also be used for temporary and long-term storage of data associated with the management of energy consumption within the entities (102). This may include predicted energy consumption data, actual recorded energy consumption data of the first computing devices (104) within the entities (102), and a history of priorities or preferences assigned to specific first computing devices (104) over time. For example, one or more users (not shown in FIG. 1) may assign priorities for the one or more first computing devices (104). In an embodiment, the meaning of different levels of priorities may be flexible, and may change depending on a time of day or a day of week or some other temporal factor. By providing the system (110) with priorities of respective first computing devices (104), the user(s) of the first computing device(s) (104) indicates a preferred sequence for disconnection of, or adjustment of energy to, the first computing device(s) (104) from the main entity (114) (for example, a power grid). The result is that the system (110) may provide smart energy management services such as, but not limited to, to disconnect or manage the first computing devices (104) in a prescribed order, leaving a level of control with the user(s).

In an embodiment, the system (110) may facilitate forecasting or predicting energy consumption of the first computing devices (104) in the network architecture (100) based on monitoring data corresponding to operation of the first computing devices (104) over a period of time, and providing smart energy management services to the one or more first computing devices (104). In accordance with an embodiment, the network architecture (100) may comprise one or more sensors (not shown in FIG. 1), which have the ability to at least collect and/or record time-dependent readings of energy consumption of the one or more first computing devices (104), but which may also have more advanced features that are operable under the control of the system (110). As such, the one or more sensors may generate information corresponding to the operation of the one or more first computing devices (104). In an exemplary embodiment, the one or more sensors may collect information such as, but not limited to, energy consumption at the one or more first computing devices (104) over a period of time, and the like. In an embodiment, the one or more sensors may include, but not be limited to, smart meters, and the like. The one or more sensors may be programmable and controllable in order to remotely detect, monitor, calculate, and control energy consumption of the one or more first computing devices (104). Alternatively, the first computing device (104) may be an aggregate node, for example, a smart meter that aggregates energy information across different consuming devices such as the entities (102) in a home or an enterprise. In particular, the first computing device (104) may be implemented as a smart meter in an exemplary embodiment.

In an embodiment, the one or more sensors may send the collected information to a local aggregate node such as a first computing device (104), which may forward the information to the system (110) for further analysis. In an example embodiment, the one or more sensors may communicate with the local aggregate node over suitable protocols including, but not limited to, Wireless Fidelity (Wi-Fi), Bluetooth, Zigbee, cellular 4G/5G/6G device to device communications, and the like. In another example embodiment, the one or more sensors may use a long-range protocol such as, but not limited to, based on Long Range (LORA) protocol to communicate over a longer distance. A person of ordinary skill in the art will understand that LORA may refer to a physical layer protocol that uses spread spectrum modulation and supports long-range communication at the cost of a narrow bandwidth. In an embodiment, the local aggregate node may communicate with the system (110) using one or more communication technologies such as, but not limited to, optical, cellular wireless, satellite, and the like.

The one or more sensors may provide, in addition to energy usage information, additional information about the entities (102) associated with the first computing devices (104), for instance, one or more of: levels of light, temperature, and inactivity of a first computing device (104) within the entity (102). This additional data may also be sent to the system (110), which may be used in isolation or combined with other data to provide smart energy management services. In particular, the system (110) may identify energy consumption patterns for each of the first computing devices (104). In an embodiment, the system (110) intelligently analyses the information to make decisions such as, but not limited to, whether and how much to charge for consumption of backup energy on a per-device basis, or generate demand response-related commands such as to the first computing devices (104) to selectively reduce energy according to a plurality of rules.

In an embodiment, the system (110) receives one or more parameters from the server (112) to make decisions, i.e., to provide smart energy management services. As such, the server (112) stores the one or more parameters related to the main entity (114). For example, the one or more parameters may include, but not be limited to, an amount of renewable energy produced, battery (charge) storage capacity, and dynamic energy pricing.

In an embodiment, the server (112) may also store parameters related to pricing of provisioned backup energy based on time periods of reduced energy from the main entity (114). In an embodiment, differential pricing criteria may be applied so that different first computing devices (104) are charged differently based on a percentage of consumption of the backup energy by a computing device in relation to total backup energy consumed within the entity (or other criteria).

In an embodiment, based on the information corresponding to the one or more first computing devices (104) and the one or more parameters, the system (110) may intelligently predict the energy consumption and/or an optimal energy consumption at the one or more first computing devices (104). Based on such prediction, the system (110) may provide personalized energy management services to the one or more first computing devices (104) via the network (106). For example, the personalized energy management services may include one or more recommendations. In an embodiment, the one or more recommendations may correspond, but not be limited to, consumption of the renewable energy produced at the main entity (114), store excess energy produced, and feeding of energy back to the main entity (114) based on dynamic energy pricing.

In an embodiment, the data communication between the first computing devices (104) and the system (110) and/or the main entity (114) may be facilitated by enabling network slicing. For example, the information of the one or more first computing devices (104) may be communicated to the system (110) via a massive machine-type communications (mMTC) network slice. A person of ordinary skill in the art will understand that mMTC services are built to serve massive numbers of devices in a small area with the expec-

| tation that they generate little data (about tens of bytes per second) and can tolerate high latency (up to 10 seconds on a round trip). Further, the specifications require that sending and receiving data requires little power so that devices can have long battery lives.

As another example, demand response requests based on current load of the main entity (114) can be sent over an ultra-reliable low-latency communications (URLLC) network slice. A person of ordinary skill in the art will understand that URLLC uses 5G to deliver secure communications with latencies of 1 millisecond (ms) and high reliability with low, or even zero, packet loss.

In accordance with embodiments of the present disclosure, the system (110) is configured to gather an aggregate of energy usage or consumption data from the first computing devices (104) within the entities (102), monitor incoming supply patterns from the main entity (114), and then perform one or more of the following functions (among others): (i) control demand response down to the first computing devices (104) within the entities (102) to address blackout or brownout conditions (either on its own or as directed by the main entity (114)); (ii) estimate backup power/energy requirements and consumption, and costs to charge individual first computing devices (104) for backup power/energy consumed, and the like.

Therefore, the present disclosure of smart energy management system optimizes energy consumption in a network architecture (100). In addition, the present disclosure provides differential pricing of backup energy to the one or more first computing devices (104). Further, the system (110) uses energy consumption patterns to more-intelligently develop demand response rules that address various concerns such as, but not limited to, lack of energy supply or higher levels of demand response based on higher than usual growth in demand, or the like. Furthermore, according to various principles of the present disclosure, energy usage can be optimized to deliver power in the most efficient way, where efficiency is defined in terms of the amount of energy used, pricing, or a balance of the two. In the present disclosure, various algorithms can be used by the system (110) to increase the energy and cost savings by integrating supply side options with energy consumption choices.

Although FIG. 1 shows exemplary components of the network architecture (100), in other embodiments, the network architecture (100) may include fewer components, different components, differently arranged components, or additional functional components than depicted in FIG. 1. Additionally, or alternatively, one or more components of the network architecture (100) may perform functions described as being performed by one or more other components of the network architecture (100).

Turning now to FIG. 2, there is shown an example network architecture (200) for managing energy consumption associated with one or more computing device(s) (202), in accordance with an embodiment of the present disclosure. A person of ordinary skill in the art will understand that the computing device(s) (202) may be similar in their functionality with the first computing device(s) (104) of FIG. 1, and hence, may not be described again in detail for the sake of brevity.

Referring to FIG. 2, the network architecture (200) includes one or more sensors (204) to collect and/or record information associated with operation of the computing device(s) (202). For example, the information may include, but not be limited to, current energy usage of the computing device(s) (202), energy consumption pattern over a period of time, connectivity of the computing device(s) (202) to one or more energy sources, and the like. In an embodiment, the one or more sensors (204) may include, but not be limited to, smart meters, and the like.

In an embodiment, the information associated with the operation of the computing device(s) (202) is sent to a system (206), such as an energy management system, i.e., data collection (208). In particular, actual energy consumption is monitored and recorded using information supplied to the system (206) by the one or more sensors (204). It will be appreciated that maintaining historical usage data also enables an operator of the system (206) to review actual energy consumption over past periods, for example for comparative purposes. For this reason, historical usage data may be retained for a relatively long period of time, and even over many years.

A person of ordinary skill in the art will understand that the system (206) may be similar in its functionality to the system (110) of FIG. 1, and hence, may not be described again in detail for the sake of brevity. In an embodiment, the system (206) provides smart energy management services to the computing device(s) (202) in the network architecture (200) through a network, such as the network (106) of FIG. 1. Alternatively, or additionally, the system (206) provides smart energy management services to the computing device (s) (202) via network slicing, i.e., slicing the network (106) into one or more appropriate slices.

In an embodiment, the system (206) performs data analysis (210) on the collected information. By way of example but not limitation, the system (206) may identify energy consumption patterns of the computing device(s) (202) over a period of time. Data analysis (210) may be performed to optimise the use of energy consumption across various computing devices (202) associated with one or more entities in the network (106).

Based on the data analysis (210), the system (206) performs data prediction (212), i.e., the system (210) predicts future or expected energy consumption by the computing device(s) (202) for a predetermined time period (for example, a particular time in a day, a day, a week, and/or a month). In an embodiment, the system (206) may include AI-triggered engines that utilise one or more machine learning models to perform such data prediction. In an embodiment, the system (206) performs data prediction based on the collected and analysed information, i.e., based on actual energy consumption over a relevant period of time. From the perspective of management of energy consumption, the prediction of expected energy usage is significant because it enables the system (206) to identify deviations from anticipated energy consumption, which may then be used as the basis for generation of relevant warnings, alerts, and/or to apply controls to one or more computing device(s) (202) so as to optimise energy consumption.

Further, all the data from the above steps, i.e., data collection (208), data analysis (210), and data prediction (212) is sent further for data storage (214) at a database (216). In an embodiment, the database (216) may be housed within the system (206). Alternatively, or additionally, the database (216) may be similar to a server, such as the server (112) of FIG. 1. For example, the server (112) may be a centralized server, a cloud-computing system, or any other system that is network connected.

In an embodiment, the database (216) may also be used for temporary and long-term storage of data associated with the management of energy consumption within the network architecture (200). This may include predicted energy consumption data, actual recorded energy consumption data of the computing device(s) (202), or the like. Additionally, the database (216) may include data parameters(s) corresponding to one or more energy sources. In an embodiment, the data parameter(s) may include, but not be limited to, renewable energy produced by the one or more energy sources, battery (charge) storage capacity, differential pricing, and the like.

In an embodiment, the system (206) may perform data prediction (212) based on the collected and analysed information and/or the data parameter(s) extracted from the database (216). Further, based on the analysis and prediction, the system (206) determines one or more recommendations for execution at the computing device(s) (202). By way of example but not limitation, a computing device (202) such as an electric vehicle may be charged at night time based on lower dynamic energy usage and pricing during the night time. However, if a local solar panel is producing energy during daytime, then the recommendation of charging the electric vehicle at the night time may be overridden. In general, charging of the electric vehicle can be proportionately shared between the daytime and the night time based on the information associated with the operation of the electric vehicle and one or more data parameters corresponding to each source of energy, for example, based on an amount of renewable energy produced, smart grid energy pricing, and/or battery (charge) storage capacity. It will be appreciated that this is an exemplary embodiment, and other like exemplary embodiments may exist, in accordance with the present disclosure.

It should be understood that every individual entity, such as the entity (102) of FIG. 1, even of the same general type and location, may have different energy usage characteristics. For example, even two identical entities having the same number of users associated with similar computing devices and located adjacent to one another will differ, because different users have different computing device usage patterns. In accordance with embodiments of the present disclosure, a key feature of the system (206) is its ability to be aware of its operating context, i.e., particular characteristics of the computing device(s) (202), in order to provide meaningful management and control information. It will be appreciated, for example, that the patterns of energy consumption are quite different for a computing device (for example, first computing device (104-1) of FIG. 1) associated with a first entity (for example, entity (102-1) of FIG. 1), as opposed to another similar computing device (for example, first computing device (104-2) of FIG. 1) associated with a second entity (for example, entity (102-2) of FIG. 1).

Although FIG. 2 shows exemplary components/aspects of the network architecture (200), in other embodiments, the network architecture (200) may include fewer components, different components, differently arranged components, or additional functional components than depicted in FIG. 2. Additionally, or alternatively, one or more components of the network architecture (200) may perform functions described as being performed by one or more other components of the network architecture (200).

FIG. 3 illustrates an exemplary network architecture (300) in which or with which embodiments of the present disclosure may be implemented.

As illustrated, the network architecture (300) may include one or more sensors such as, but not limited to, one or more smart meters (304-1, 304-2, 304-3, 304-4). A person of ordinary skill in the art will understand that one or more smart meters may be individually referred to as the smart meter (304) and collectively referred to as the smart meters (304). Although four smart meters (304) are depicted in FIG.

3, however any number of smart meters (304) may be included in the network architecture (300) without departing from the scope of the ongoing description.

In an embodiment, the smart meters (304) have the ability to at least collect and/or record time-dependent readings of energy consumption of one or more computing devices such as the first computing devices (104) of FIG. 1 or the computing device(s) (202) of FIG. 2, but which may also have more advanced features that are operable under the control of a smart energy management system (302). It should be understood that the smart energy management system (302), interchangeably referred to as the system (302) throughout the disclosure, may be similar in its functionality to the system (110) of FIG. 1 and the system (206) of FIG. 2, and hence may not be described again in detail for the sake of brevity. Further, in an embodiment, the smart meters (304) may generate information corresponding to an operation of the computing devices. In an exemplary embodiment, the smart meters (304) may collect information such as, but not limited to, energy consumption at the computing devices over a predetermined time period, and the like. In an embodiment, the smart meters (304) may be programmable and controllable in order to remotely detect, monitor, calculate, and control energy consumption of the computing devices.

In an embodiment, the smart meters (304) may send the collected information to the system (302) over a network (306) for further analysis. The smart meters (304) may provide, in addition to energy usage information, additional information about the entities (for example, entities (102) of FIG. 1) or the premises associated with the computing devices, for instance, one or more of: levels of light, temperature, and inactivity of a computing device within an entity. This additional data may also be sent to the system (302), which may be used in isolation or combined with other data to provide smart energy management services.

In an embodiment, the network (306) may include at least one of a 5G network, or the like. The network (306) enables the smart meters (304) to communicate with other components in the network architecture (300) and/or with the system (302). The network (306) may include a wireless card or some other transceiver connection to facilitate this communication. In another embodiment, the network (306) may be implemented as, or include, any of a variety of different communication technologies such as a WAN, a LAN, a wireless network, a mobile network, a VPN, the Internet, the PSTN, or the like.

Referring to FIG. 3, the system (302) provides smart energy management services to different users associated with respective computing devices. In an embodiment, the system (302) collects the information corresponding to the operation of the computing devices from the smart meters (304), extracts a set of parameters from a database/server (not shown in FIG. 3) corresponding to one or more energy sources, and provides the smart energy management services to the computing devices via the smart meters (304). In an embodiment, the system may predict an optimised cost of energy consumption by the computing devices associated with each of the smart meters (304), and based on such prediction, the system (302) may provide one or more recommendations. In an example, the one or more recommendations may correspond, but not be limited to, directing the computing device to consume dynamic renewable energy produced at one or more energy sources at a predetermined time period, feed excess energy back to the system, or the like.

In another embodiment, the system (302) may provide the smart energy management services to the smart meters (304) and thus the computing devices via network slicing. A person of ordinary skill in the art will understand that network slicing is a key feature of 5G. For example, a 5G network operator can slice a single network, or combine the capacity of multiple networks and slice the pooled resources. In an embodiment, the information of the one or more computing devices may be communicated from the smart meters (304) to the system (302) via an mMTC network slice. A person of ordinary skill in the art will understand that mMTC services are built to serve massive numbers of devices in a small area with the expectation that they generate little data (about tens of bytes per second) and can tolerate high latency (up to 10 seconds on a round trip). Further, the specifications require that sending and receiving data requires little power so that devices can have long battery lives.

As another example, demand response requests based on current load of energy sources can be sent over a URLLC network slice. A person of ordinary skill in the art will understand that URLLC uses 5G to deliver secure communications with latencies of 1 millisecond (ms) and high reliability with low, or even zero, packet loss.

As another example, if an operator of the system (302) desires to directly interact with a user of the computing device(s), then an Enhanced Mobile Broadband (eMBB) network slice can be requested on the 5G network (306) (for example, for video conferencing) coupled with the URLLC network slice (for example, for text data). A person of ordinary skill in the art will understand that eMBB provides mobile data access in one of three ways: to dense collections of users, to high mobile users, and to users spread over wide areas.

In an embodiment, the system (302) depending on the 5G network (306) may contract (i.e., smart contract) for a network slice, in accordance with embodiments of the present disclosure. Alternatively, or additionally, smart contract micro-services may be executed and corresponding transactions related to energy consumption and/or management may be recorded in blockchain ledgers to provide greater trust and reliability in such energy management systems. The convergence of blockchain technology with 5G, IoT, and cloud services fosters in a host of new services that were not possible before. The convergence of these unique technologies facilitates a neutral host environment and network slicing.

Because smart contracts in a blockchain are immutable, they can be used for a more effective way of delivering and verifying contracts which can also include the software code and or configuration of a computing device, i.e., an IoT device. Blockchain provides a distributed ledger that is shared providing a history or rather record of all previous actions which is immutable due to the unique cryptographic security that blockchain uses. Blockchain also enables smart contracts which lead to machine-to-machine communication for delivering contracts. In an embodiment, smart contracts can also be used to provide automated configurations where the 5G network (306) is dynamically changed in near real time meeting particular contract requirements.

Therefore, the smart energy management system (302) performs various functions such as, but not limited to, energy analysis, monitoring energy consumption, ledger management, demand predictions, and the like.

Although FIG. 3 shows exemplary components/aspects of the network architecture (300), in other embodiments, the network architecture (300) may include fewer components, different components, differently arranged components, or additional functional components than depicted in FIG. 3. Additionally, or alternatively, one or more components of the network architecture (300) may perform functions described as being performed by one or more other components of the network architecture (300).

FIG. 4 illustrates an exemplary computer system (400) in which or with which embodiments of the present disclosure may be implemented. For example, the smart energy management system (110, 206, 302 of FIGS. 1-3) may be implemented as the computer system (400). Alternatively, or additionally, the computing device(s) (104, 202 of FIGS. 1-2) may be implemented as the computer system (400).

As shown in FIG. 4, the computer system (400) may include an external storage device (410), a bus (420), a main memory (430), a read-only memory (440), a mass storage device (450), communication port(s) (460), and a processor (470). A person skilled in the art will appreciate that the computer system (400) may include more than one processor and communication ports. The communication port(s) (460) may be any of an RS-232 port for use with a modem-based dialup connection, a 10/100 Ethernet port, a Gigabit or 10 Gigabit port using copper or fiber, a serial port, a parallel port, or other existing or future ports. The communication port(s) (460) may be chosen depending on a network, such a Local Area Network (LAN), Wide Area Network (WAN), or any network to which the computer system (400) connects. The main memory (430) may be random access memory (RAM), or any other dynamic storage device commonly known in the art. The read-only memory (440) may be any static storage device(s) including, but not limited to, a Programmable Read Only Memory (PROM) chips for storing static information e.g., start-up or basic input/output system (BIOS) instructions for the processor (470). The mass storage device (450) may be any current or future mass storage solution, which may be used to store information and/or instructions.

The bus (420) communicatively couples the processor (470) with the other memory, storage, and communication blocks. The bus (420) can be, e.g. a Peripheral Component Interconnect (PCI)/PCI Extended (PCI-X) bus, Small Computer System Interface (SCSI), universal serial bus (USB), or the like, for connecting expansion cards, drives, and other subsystems as well as other buses, such a front side bus (FSB), which connects the processor (470) to the computer system (400).

Optionally, operator and administrative interfaces, e.g. a display, keyboard, and a cursor control device, may also be coupled to the bus (420) to support direct operator interaction with the computer system (400). Other operator and administrative interfaces may be provided through network connections connected through the communication port(s) (460). In no way should the aforementioned exemplary computer system (400) limit the scope of the present disclosure.

Thus, the present disclosure provides a unique and effective solution for monitoring energy consumption and providing personalized smart energy management services to users or enterprises. The disclosed system provides a combination of smart sensor monitoring, availability of different types of 5G network slices based on time criticality of services or network performance requirements, knowledge of renewable energy availability, stored energy availability, and/or dynamic grid pricing based on available of cloud/edge resources for machine learning and prediction. Additionally, the disclosed system may also utilize blockchain-based platforms to execute smart contracts to render such services.

While considerable emphasis has been placed herein on the preferred embodiments, it will be appreciated that many embodiments can be made and that many changes can be made in the preferred embodiments without departing from the principles of the invention. These and other changes in the preferred embodiments of the invention will be apparent to those skilled in the art from the disclosure herein, whereby it is to be distinctly understood that the foregoing descriptive matter to be implemented merely as illustrative of the invention and not as limitation.

Advantages of the Present Disclosure

The present disclosure provides a system and a method for facilitating smart energy management in a network.

The present disclosure predicts and provides personalized smart energy management services to users or enterprises.

The present disclosure facilitates network slicing based on time criticality of services or network performance requirements, knowledge of renewable energy availability, stored energy availability, and dynamic grid pricing.

The present disclosure provides blockchain-based platforms to execute smart contracts to render smart energy management services.

We claim:

1. A system (110) for facilitating energy management services, the system (110) comprising:
   one or more processors (470); and
   a memory operatively coupled to the one or more processors (470), wherein the memory comprises processor-executable instructions, which on execution, cause the one or more processors (470) to:
      record information corresponding to operation of one or more computing devices (104) in a network (106);
      extract one or more parameters corresponding to one or more sources of energy in the network (106) based on the recorded information; and
      based on the extracted one or more parameters and the recorded information of the one or more computing devices (104), provide personalized energy management services to each of the one or more computing devices (104) via at least one slice of the network (106), wherein the personalized energy management services comprise one or more recommendations to be executed at the one or more computing devices (104).

2. The system (110) as claimed in claim 1, wherein the information corresponding to the operation of the one or more computing devices (104) comprises at least one of: an amount of energy usage by the one or more computing devices (104) over a predetermined time period, and connectivity of the one or more computing devices (104) to said one or more sources of energy.

3. The system (110) as claimed in claim 1, wherein the information corresponding to the operation of the one or more computing devices (104) is collected by one or more sensors (204) associated with the one or more computing devices (104) in the network (106).

4. The system (110) as claimed in claim 1, wherein the one or more parameters corresponding to said one or more sources of energy comprise at least one of: an amount of renewable energy produced at said one or more sources of energy, battery storage capacity, and dynamic energy pricing.

5. The system (110) as claimed in claim 4, wherein the one or more recommendations correspond to at least one of consumption of the amount of renewable energy produced at said one or more sources of energy, and feeding of excess energy back to said one or more sources of energy based on the dynamic energy pricing.

6. The system (110) as claimed in claim 1, wherein the memory comprises processor-executable instructions, which on execution, cause the one or more processors (470) to provide the one or more recommendations by being configured to predict an expected energy consumption by the one or more computing devices (104) at a predetermined time period in future based on the recorded information and the extracted one or more parameters.

7. The system (110) as claimed in claim 1, wherein the network (106) comprises said at least one slice for facilitating communication between the one or more computing devices (104) and the system (110).

8. The system (110) as claimed in claim 1, wherein the information corresponding to the operation of the one or more computing devices (104) is collected from one or more sensors (204) over a massive machine-type communications (mMTC) network slice.

9. The system (110) as claimed in claim 1, wherein the system (110) executes a smart contract for providing the personalized energy management services to each of the one or more computing devices (104) via said at least one slice of the network (106).

10. The system (110) as claimed in claim 9, wherein the system (110) is implemented as a blockchain-based platform to execute the smart contract.

11. The system (110) as claimed in claim 10, wherein the system (110) is implemented in a hierarchical network, wherein the hierarchical network comprises a layer 2 network with the smart contract layered on top of layer 1 network of blockchain nodes, and wherein aggregated data is submitted at the hierarchical network from the layer 2 network to the layer 1 network.

12. A method for providing energy management services, the method comprising:
   recording, by one or more processors (470), information corresponding to operation of one or more computing devices (104) in a network (106);
   extracting, by the one or more processors (470), one or more parameters corresponding to one or more sources of energy in the network (106) based on the recorded information; and
   based on the extracted one or more parameters and the recorded information of the one or more computing devices (104), providing, by the one or more processors (470), personalized energy management services to each of the one or more computing devices (104) via at least one slice of the network (106), wherein the personalized energy management services comprise one or more recommendations to be executed at the one or more computing devices (104).

13. The method as claimed in claim 12, wherein the information corresponding to the operation of the one or more computing devices (104) comprises at least one of: an amount of energy usage by the one or more computing devices (104) over a predetermined time period, and connectivity of the one or more computing devices (104) to said one or more sources of energy.

14. The method as claimed in claim 12, wherein the information corresponding to the operation of the one or more computing devices (104) is recorded by one or more sensors (204) associated with the one or more computing devices (104) in the network (106).

15. The method as claimed in claim 12, wherein the one or more parameters corresponding to said one or more sources of energy comprise at least one of: an amount of renewable energy produced at said one or more sources of energy, battery (charge) storage capacity, and dynamic energy pricing.

16. The method as claimed in claim 15, wherein the one or more recommendations correspond to at least one of consumption of the amount of renewable energy produced at said one or more sources of energy, and feeding of excess energy back to said one or more sources of energy based on the dynamic energy pricing.

17. The method as claimed in claim 12, comprising predicting, by the one or more processors (470), an expected energy consumption by the one or more computing devices (104) at a predetermined time period based on the recorded information and the extracted one or more parameters.

18. The method as claimed in claim 12, wherein the information corresponding to the operation of the one or more computing devices (104) is collected from one or more sensors (204) over a massive machine-type communications (mMTC) network slice.

19. The method as claimed in claim 12, comprising executing, by the one or more processors (470), a smart contract for providing the personalized energy management services to each of the one or more computing devices (104) via said at least one slice of the network (106).

20. The method as claimed in claim 19, comprising implementing, by the one or more processors (470), a blockchain-based platform to execute the smart contract.

21. A user equipment (104), comprising:
one or more processors; and
a memory operatively coupled to the one or more processors, wherein the memory comprises processor-executable instructions, which on execution, cause the one or more processors to:
send information corresponding to operation of the user equipment (104) to a system (110) in a network (106);
receive one or more recommendations from the system (110) via at least one slice of the network (106); and
execute the one or more recommendations at a predetermined time period, wherein the one or more recommendations are based at least on the information corresponding to the operation of the user equipment (104) and one or more parameters corresponding to one or more energy sources in the network (106).

22. The user equipment (104) as claimed in claim 21, wherein the information corresponding to the operation of the user equipment (104) is recorded by one or more sensors (204) associated with the user equipment (104) in the network (106).

23. The user equipment (104) as claimed in claim 21, wherein the one or more parameters corresponding to said one or more energy sources comprise at least one of: an amount of renewable energy produced at said one or more energy sources, battery (charge) storage capacity, and dynamic energy pricing.

24. The user equipment (104) as claimed in claim 23, wherein the one or more recommendations correspond to at least one of consumption of the amount of renewable energy produced at said one or more energy sources, and feeding of excess energy back to said one or more energy sources based on the dynamic energy pricing.

25. The user equipment (104) as claimed in claim 21, wherein the memory comprises processor-executable instructions, which on execution, cause the one or more processors to receive the one or more recommendations from the system (110) based on a smart contract being executed at the system (110).

26. The user equipment (104) as claimed in claim 21, wherein the memory comprises processor-executable instructions, which on execution, cause the one or more processors to receive the one or more recommendations from the system (110) being implemented as a blockchain-based platform.

27. A non-transitory computer-readable medium comprising processor-executable instructions that cause a processor to:
record information corresponding to operation of one or more computing devices (104) in a network (106);
extract one or more parameters corresponding to one or more sources of energy in the network (106) based on the recorded information; and
based on the extracted one or more parameters and the recorded information of the one or more computing devices (104), provide personalized energy management services to each of the one or more computing devices (104) via at least one slice of the network (106), wherein the personalized energy management services comprise one or more recommendations to be executed at the one or more computing devices (104).

* * * * *